Nov. 4, 1941.  N. R. STRYKER  2,261,573
NOISE LEVEL INDICATOR
Filed Nov. 28, 1939  2 Sheets—Sheet 1

INVENTOR
N. R. STRYKER
BY
ATTORNEY

Nov. 4, 1941.   N. R. STRYKER   2,261,573
NOISE LEVEL INDICATOR
Filed Nov. 28, 1939   2 Sheets-Sheet 2
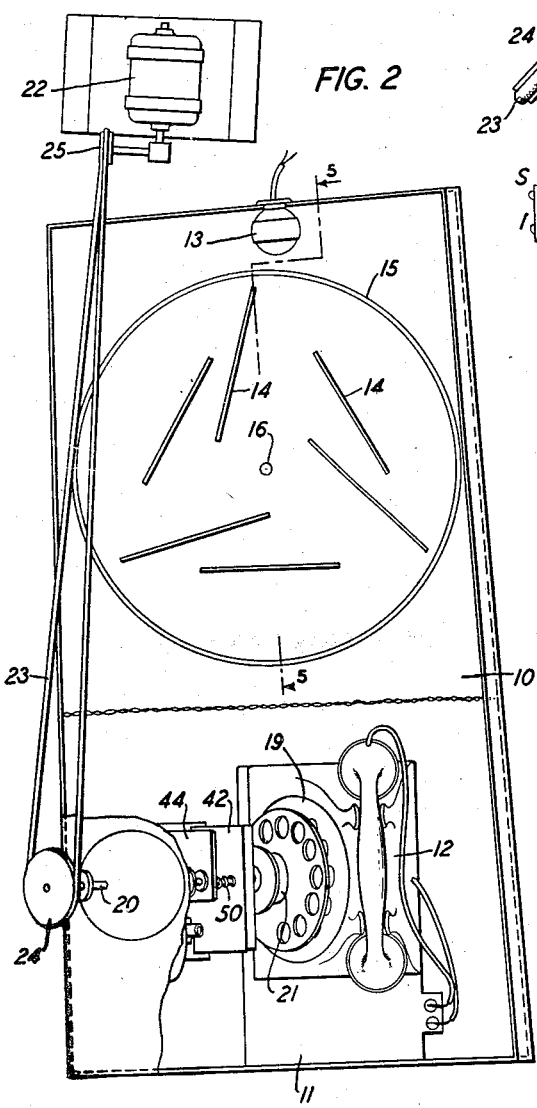
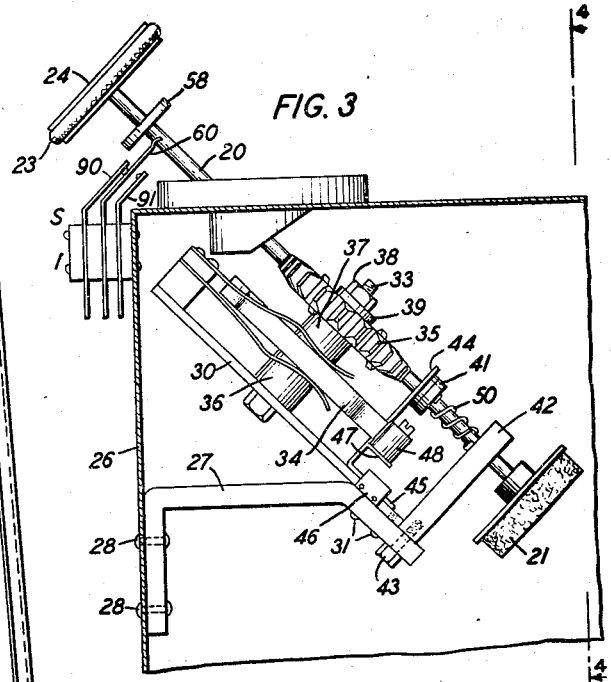
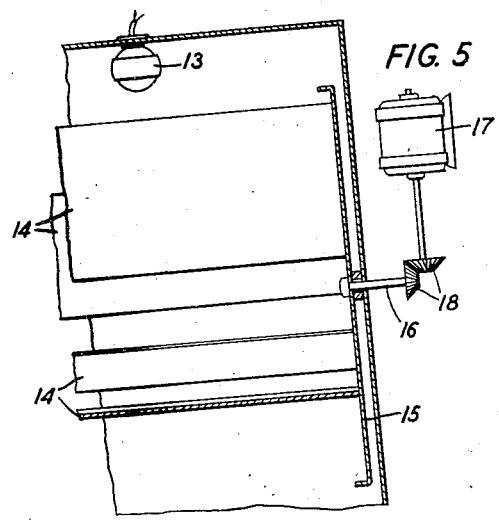
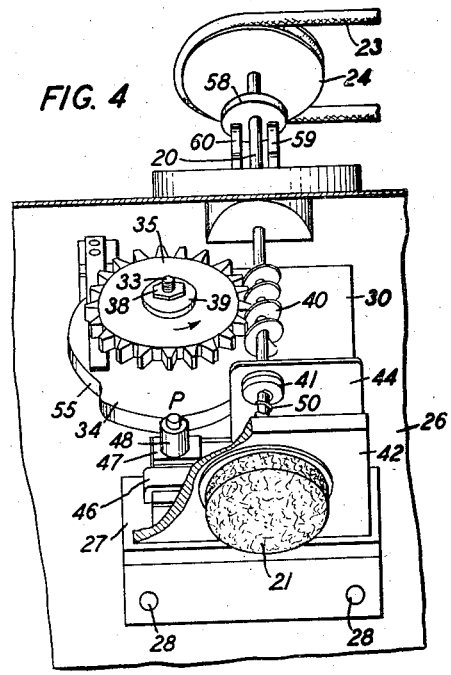
INVENTOR
N. R. STRYKER
BY
ATTORNEY Patented Nov. 4, 1941

2,261,573

UNITED STATES PATENT OFFICE 2,261,573

NOISE LEVEL INDICATOR

Norman R. Stryker, Maplewood, N. J., assignor to Bell Telephone Laboratories, Incorporated, New York, N. Y., a corporation of New York Application November 28, 1939, Serial No. 306,446

7 Claims. (Cl. 177—311)

This invention relates to sound level indicators and particularly to a system for detecting and visually indicating excessive noise levels, or levels above a predetermined permissible limit.

It is the object of this invention to provide an improved system for testing the noise level of equipment employed in telephone communication systems and particularly of telephone dials.

This object is attained in accordance with a feature of the invention by the provision of means which functions automatically to separately indicate excessive noise levels of a telephone dial during its wind-up and unwind operations.

Related features of the invention reside in the use of mechanical means for automatically operating and releasing a telephone dial and in the use of a sound pick-up device for receiving the sound emitted by the dial, converting the sound waves into electric currents, amplifying them and impressing the amplified currents upon the input side of a level indicator or feedback rectifier in whose output circuit a signal control device is located.

A further feature of the invention resides in the use of switching means which functions under control of the dial winding mechanism to automatically associate a separate signal circuit with the level indicator for each of the wind and unwind operations of the dial so as to provide a separate indication of the noise level of the dial for each of these operations.

The invention will be readily understood from the following detailed description made with reference to the accompanying drawings, in which:

Fig. 2 is a top plan view of a sound chamber with the greater portion of the top wall broken away to disclose the relative positions of the elements housed therein;

Fig. 3 is a side view of the dial operating mechanism;

Fig. 4 is another view of the dial operating mechanism taken in such a direction as to more clearly illustrate the component parts thereof; and Fig. 5 is a partial side view of the interior of the sound chamber illustrating the vane structure housed in the chamber and the operating mechanism therefor.

Figure 1:
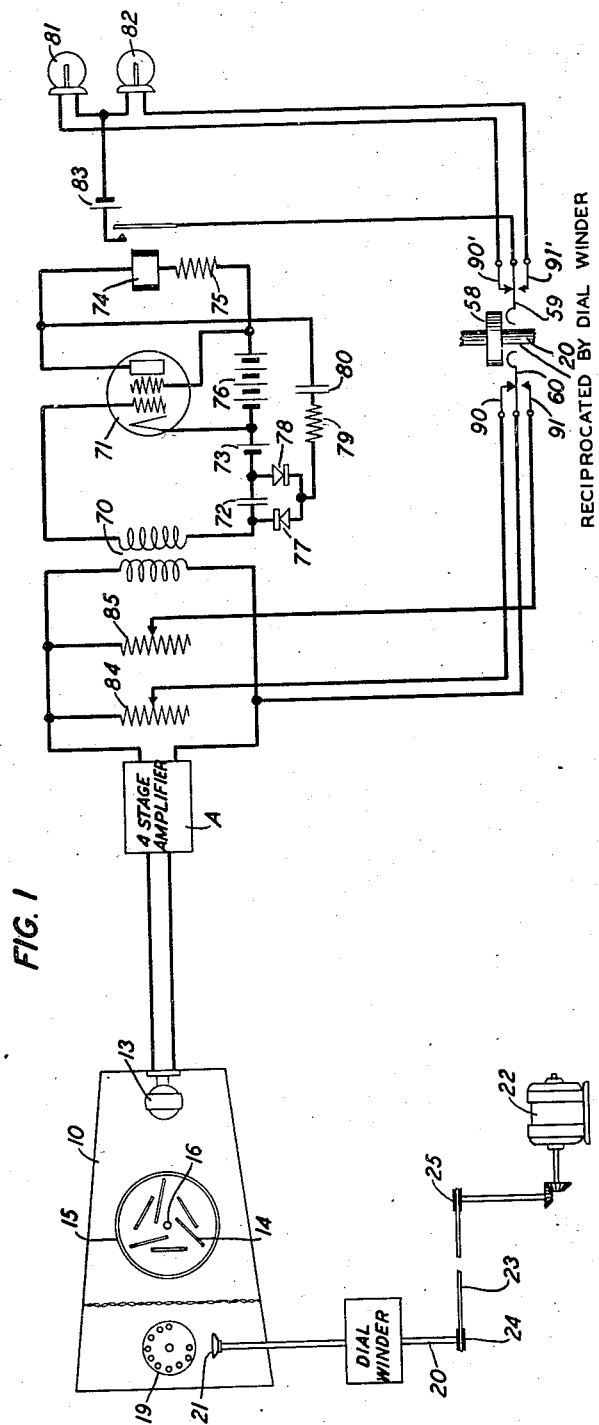
Fig. 1 is a diagrammatic representation of the essential elements of which the system of this invention is composed, illustrating the level indicator or feedback rectifier circuit in detail and the remaining elements of the system schematically.

Though the drawings illustrate a system designed particularly for testing the sound output of a telephone dial, it is to be understood that the principles involved are equally effective in testing the sound level of other equipment, such as telephone ringers.

The sound chamber comprises an irregularly-shaped box 10, none of whose walls are parallel but which are sound insulating and acoustically hard. The front end or wall of the box 10 constitutes a hinged door and has secured thereto a shelf 11 upon which the device, such as the telephone set 12, under test is removably secured. At the other extreme end of the sound chamber there is located a sound pick-up device or microphone 13 of non-directional design. The microphone is mounted in any suitable manner so as to be permanently located as shown. A non-directional microphone is used so as to pick up sound from every direction equally.

Between the microphone 13 and telephone set 12, a group of irregularly-shaped vanes 14 is mounted on a rotatable plate or table 15 which, in turn, is supported on the shaft 16 extending through the lower wall or floor of the sound chamber. The plate or turntable 15 with its associated vanes 14 is driven by means of a motor 17 which is geared to the shaft 16 in any suitable manner, as by the beveled gears 18 illustrated. If desirable, the turntable 15 may be arranged to rest directly on the shaft of motor 17. The vanes insure, in conjunction with the irregular walls of the box, many sound reflections which give a more uniform sound field at the microphone.

To measure the noise of the dial 19, the apparatus is equipped with an automatic dial-winding mechanism which is clearly illustrated in Figs. 3 and 4. This mechanism consists of a shaft 20 having a rubber ring or disc 21 secured to one end. The shaft is so supported on the box 10 as to be coaxial with the dial 19 when the door of the box is closed. This shaft is continuously rotated by means of a motor 22, having a belt 23 which interconnects a pulley 24 on the shaft 20 and a pulley 25 associated with the motor shaft. The dial operating mechanism may be secured to one of the side walls 26 of the sound chamber by means of a bracket 27 having a flange thereof fixed to the inner face of the side wall 26 by means of bolts 28 or their equivalents. The inner end of the bracket is inclined, forming a seat to which a plate 30 is secured by means of screws 31, and held in a plane parallel to that of the longitudinal axis of the shaft 20. Substantially at its mid-point, the plate 30 is apertured to accommodate a bolt 33 upon which are mounted a cam 34 and a toothed wheel 35. The cam 34 is spaced from the plate 30 by means of a collar 36 while the cam 34 and the wheel 35 are held in spaced relation by a collar 37. When the cam 34, wheel 35 and the collars 36 and 37 are positioned on the bolt 33, they are held in position by the nut 38 and its associated washer 39. In this assembly, the cam 34 and wheel 35 are arranged for simultaneous rotation.

The shaft 20 is provided with a worm 40 which normally engages the teeth of the wheel 35 as clearly shown in Fig. 4. Between the worm 40 and the rubber disc 21, the shaft 20 is provided with a collar 41 which is fixed to the shaft.

Near the lower edge of the bracket 27 there is located a rectangular metal piece 42 which is secured to the bracket 27 by means of screw bolts 43. Near its upper edge and midway between its side edges, the piece 42 is provided with a circular aperture through which the shaft 27 extends and which acts as one of the bearings for the shaft.

A plate 44 is provided with a right angle projection 45 which is free to move up and down on the face of the plate 30 in a slot effected by a bracket 46 secured to the side edge of plate 30. The plate 44 is provided with a depending lug or projection 47 to which there is rotatably secured a roller or cam follower 48. Interposed between the metal piece 42 and the shaft collar 41 is a compression spring 50 coiled about the shaft 20. By virtue of the action of spring 50 the cam follower 48 is maintained constantly in engagement with the edge of the cam 34.

The cam 34 is designed in such a manner that it comprises three identical camming arcs, each of which acts upon the cam follower 48 so as to cause it to gradually move downwardly and then to be quickly released. Upon release, the follower is forced into the lowest point of the cam (indicated at 55) under the action of compression spring 50, as will be more fully apparent from the following description of the operation of the mechanism.

In Fig. 4 the dial-winding mechanism is illustrated in its normal or unactuated condition. In this condition the cam follower 48 is shown in engagement with a cam surface at a point P intermediate two adjacent low points 55, and in this position the compression spring 50 retains the rubber disc 21 out of engagement with the dial finger-wheel. When the motor 22 is operated, the shaft 20 is caused to rotate by the belt 23. The worm 40 carried by the shaft 20 experiences a similar rotation and due to its engagement with the teeth of wheel 35, the wheel and cam 34 are rotated in the direction indicated by the arrow on the wheel. The follower 48 is thus traversed by that portion of the cam to the left of point P which is so designed as to cause the cam follower and its mounting plate 44 to move downwardly. The plate 44, due to its engagement with the collar 41 which is fixed to shaft 20, moves the shaft and its rubber disc 21 in a direction towards the finger-wheel of the dial. The contour of the cam surface is such that the downward travel of shaft 20 persists until the rubber disc 21 makes frictional engagement with the dial number plate and maintains this engagement for an interval of time corresponding to approximately five-eighths of a revolution of the shaft 21. During this period the dial is wound up. At the end of this period the cam follower 48 has reached the end of the camming surface to the left of point P and falls into the lowest point 55 under the action of spring 50, thereby causing the disengagement of the rubber disc 21 from the dial finger-wheel and the restoration of the shaft 20 to normal. It will be understood that the shaft 20 continues to rotate during its axial movements and the cam 34 is continued rotating until the cam follower 48 reaches a point on the next camming area corresponding to the point P illustrated whence the cycle of operations is repeated. When the rubber disc 21 is disengaged from the dial finger-wheel, the dial restores to normal under the influence of its own restoring spring. It is apparent from the foregoing that the continued rotation of shaft 20 under the action of motor 22 causes the dial to be repeatedly operated and released three times for each revolution of the cam 34.

Near the upper end of the shaft 20 there is fixed a collar 58 which, when the shaft is moved downwardly, engages springs 59 and 60 on either side of the shaft. In Fig. 3 only spring 60 is disclosed and is shown normally engaging spring 90 and disengaged from the spring 91. It is to be understood that the spring 59 (Fig. 4) cooperates with a similar pair of springs 90' and 91' illustrated in Fig. 1.

The position of the collar 58 on the shaft 20 relative to the springs 59 and 60 is such that it moves these springs into engagement with springs 91' and 91, respectively, just as the rubber disc 21 engages the dial finger-wheel, and into engagement with springs 90' and 90 just as the disc 21 leaves the dial finger-wheel. The circuits controlled by the springs 59 and 60 and their cooperating contact springs will be more fully referred to hereinafter.

Particular reference will now be made to Fig. 1. The moving coil microphone 13, as hereinbefore indicated, is located at one end of the sound chamber 10 and is adapted to pick up the sounds emitted by the contacts of the dial when the dial is actuated. The consequent voltages developed by the microphone are impressed on the input of the four-stage amplifier A, the output of which is connected to the input side of a "level indicator" through the transformer 70. The magnitudes of these voltages are proportional to the level of the noise generated by the operating dial contacts. The "level indicator" comprises the electronic tube 71 which functions as a rectifier having a characteristic such that it has a low normal plate current. The filament-grid circuit of tube 71 includes the secondary winding of transformer 70, condenser 72 and the normal grid biasing battery 73. The grid bias is illustrated as being furnished by a battery merely to simplify the disclosure, it being understood that such bias may be furnished by means of a rectifier connected to an alternating current source. The filament-plate circuit of the tube 71 includes the winding of relay 74, resistance 75 and the plate suppply 76, which like the grid bias, may be furnished by means of a rectifier. The tube is provided with a screen grid which is connected to the plate supply as shown. A feedback circuit is tapped into the plate circuit at a point between the plate electrode and the relay 74 and includes condenser 80, resistance 79 and the two oppositely poled dry rectifiers 77 and 78. The alternating current voltages developed by the microphone 13 are amplified by the amplifier A and impressed on the grid of the tube 71 through the medium of the transformer 70. The tube 71 functions to pass the alternating current to the plate electrode from whence it is fed back through condenser 80 and resistance 79 and is rectified by the rectifiers 77 and 78, causing the condenser 72 to be charged to a polarity opposite to that of the grid battery 73. The grid bias, a resultant of the voltages of condenser 72 and battery 73 is thus a function of the input signal, as is also the resulting plate current. The resulting rectified current in the plate circuit energizes the winding of relay 74 and will cause the relay to operate if the level of the sound picked up is of sufficient magnitude. The potentiometers 85 and 84 (for dial wind and dial release, respectively) may be adjusted for any desired sound input so that, whenever these levels are reached or exceeded, the resulting increased plate current operates the relay 74 which, at its armature and front contact, connects battery 83 to whichever of the lamp signals 81 or 82 has its operating circuit prepared by the spring 59. The "level indicator" constitutes a "reaction feedback rectifier" and functions as a highly sensitive means for indicating a given level of the output voltages of the amplifier A. It serves to increase the normally low plate current of tube 71 to a value sufficient to operate relay 74 when the output level of the amplifier A is such as to require the operation of this relay.

The potentiometers 84 and 85 are alternately connected across the input side of the amplifier in accordance with the axial displacement of shaft 20, that is, as the shaft is driven downwardly into engagement with the face of the dial, the spring 60 is moved into engagement with spring 91 by the action of the shaft collar 58, and when the shaft returns to normal, that is, just as the rubber disc 21 leaves the dial face, the spring 60 moves out of engagement with spring 91 and into engagement with spring 90. It is apparent, therefore, that during the time the rubber disc 21 is in engagement with the dial face, that is, during the wind-up of the dial, potentiometer 85 is connected across the amplifier input whereas during the release period of the dial potentiometer 84 is connected across the input of the amplifier. The potentiometers 85 and 84 (for dial wind and dial release, respectively) may be adjusted for any desired sound input so that, whenever these levels are reached or exceeded, the resulting increased plate current operates the relay 74 which, at its armature and front contact, connects battery 83 to whichever of the lamp signals 81 or 82 has its operating circuit prepared by the spring 59.

The dial tester above described is operated in the following manner:

After the dial, or telephone set is seated in correct position on the shelf 11 of the sound chamber door, the door is closed; motor 17 is started to drive the vanes 14 and the motor 22 is actuated to cause the rotation of the shaft 20. Due to the action of cam 34 on the cam follower 48 during the rotation of the shaft 20, the rubber disc 21 approaches the dial face and frictionally engages it. Simultaneously with the engagement of the dial face by the rubber disc, the springs 59 and 60 are moved out of engagement with springs 90' and 90, respectively, and into engagement with springs 91' and 91, respectively. Due to the engagement of springs 60 and 91 the potentiometer 85, corresponding to the dial wind-up, is connected across the amplifier output and due to the engagement of springs 59 and 91' a circuit for lamp 82 (which may be colored red) is prepared. If the sound emitted by the dial contacts is such, during the wind-up of the dial, as to produce a plate current of sufficient magnitude, as determined by the setting of the potentiometer 85, to cause relay 74 to operate, the circuit for lamp 82 will be completed, causing the lighting of this lamp as an indication that the level of the noise emitted by the dial contacts during the wind-up operation is equal to or exceeds a predetermined permissible limit.

As the shaft 20 continues to rotate, the cam 34 functions, when the dial is completely wound up, to permit the shaft to spring back under the action of compression spring 50, causing the disengagement of the rubber disc 21 from the dial face. Simultaneously with the disengagement of the disc 21 from the dial face, the shaft collar 58 permits springs 59 and 60 to move out of engagement with springs 91' and 91, respectively, and into engagement with springs 90' and 90, respectively. Due to this spring action, potentiometer 84 is substituted for potentiometer 85 in the amplifier output circuit, the circuit for lamp 82 is opened and the circuit for lamp 81 (which may be colored green) is prepared. The dial restores to normal under the action of its own restoring spring and the sound emitted by its contacts during this unwind operation is picked up by the microphone 13. Should the level of the sound emitted by the contacts during the unwind operation be of such magnitude as to cause sufficient current to flow in the level indicator plate circuit, relay 74 again operates to cause lamp 81 to be lighted. If the sound level of the dial during its wind and unwind operations does not equal or exceed the predetermined permissible maximum, the lamps 82 and 81 do not operate due to the lack of sufficient current in the plate circuit to operate relay 74.

It will be noted that the shaft 20 and its associated worm 40 experience simultaneous axial and rotational movements due to the thrust thereof caused by the cam 34 and its follower 48, and to the driving action of motor 22. Since the teeth of the wheel 35 are continuously engaged by the worm 40, it will be apparent that the rotational speed of the wheel and therefore of the cam will not be uniform but will gradually decrease from a maximum to substantially zero as the shaft moves axially downwardly, and as the shaft returns to normal the speed of rotation of the wheel 35 and cam 34 again increases. The camming surfaces of the cam are so designed that contact between the rubber disc 21 and the dial finger-wheel is effected during the early part of the downward movement of the shaft and this engagement is maintained for a period of time sufficient to allow the dial to be wound up, during which time no further downward movement of the shaft is experienced. In practice, this wind-up period corresponds to approximately five-eighths of a revolution of the shaft 20. At the end of this period the cam follower 48 is in engagement with the highest point of the cam and immediately drops into the lowest point 55 under the action of spring 50 which functions also to quickly return the shaft to its original position. During the return movement of the shaft 20, the wheel 35 and cam 34 continue to rotate, with the cam follower 48 reaching a position on the edge of the next camming surface corresponding to the position it occupies in Fig. 4. This cycle of operations is repeated as long as the motor 22 drives the shaft.

What is claimed is:

1. In a system for testing the noise level of a rotatable contact operating device, an amplifier having an input and an output circuit, a sound pick-up device acoustically coupled to said device and electrically included in the input circuit of said amplifier, means for actuating said device whereby the sounds emitted by the contacts thereof are picked up by said sound pick-up device and impressed upon said amplifier as voltages commensurate with the level of the emitted sounds, a signal, control means therefor, means responsive to the output voltage of said amplifier for controlling the operation of said signal control means and means controlled by said device actuating means for placing said signal under the influence of said signal control means.

2. In a system for testing the noise level of a contact operating switch having forward and reverse rotary movements, an amplifier having an input and an output circuit, a sound pick-up device acoustically coupled to said switch and electrically included in the input circuit of said amplifier, means for actuating said device to cause it to perform its forward and reverse movements whereby the sounds emitted by the contacts during these movements are picked up by said pick-up device and impressed upon said amplifier as voltages commensurate with the level of the emitted sounds, a signaling device corresponding to each of the forward and reverse movements of said switch, control means therefor, means included in the output circuit of said amplifier for controlling the operation of said control means and means controlled by said device actuating means for placing said signaling devices under the influence of said control means alternately.

3. In a system for indicating the noise level of a contact operating device having a forward and a reverse contact operating movement, means for alternately operating said device in its forward and reverse directions, a sound wave responsive device acoustically coupled to said contact operating device and adapted to develop voltages in response to the operation of said contact operating device, means for amplifying said voltages, signal control means responsive to amplified voltages of predetermined magnitude, signals controlled by said control means, and means for placing one of said signals under the influence of said control means during the forward movement of said contact operating device and another of said signals under the influence of said control means during the reverse movement of said contact operating device whereby said signals are alternately actuated should the operation of said contact operating device cause said sound wave responsive device to develop voltages of equal or greater magnitude than the predetermined magnitude.

4. In a system for testing the level of sound emitted by the dialing contacts of a telephone dial, the combination of a sound chamber comprising an enclosure of irregularly-shaped walls, a telephone dial located at one end of said chamber, a sound pick-up device located at the other end of said chamber and acoustically coupled to said dial for developing voltages commensurate with the level of the sounds emitted by the contacts of said dial, means for actuating said dial, a plurality of irregularly-shaped rotating sound reflecting vanes interposed between said dial and said pick-up device for insuring a substantially uniform sound field at said pick-up device, means for amplifying the voltages developed by said sound pick-up device, means for rectifying the amplified voltages, a signal, a control device for said signal responsive to the rectified voltages and means controlled by said dial actuating device for placing said signal under the control of said signal control device.

5. A system for testing the level of sound emitted by the dialing contacts of a telephone dial comprising in combination, means for detecting a sound level in excess of a predetermined sound level, signal devices controlled by said level detecting means, means for actuating said dial whereby said dial is alternately wound up and released and its contacts operated accordingly, means for developing voltages commensurate with the level of the sound emitted by the operating contacts, means for impressing said voltages on said level detecting means, and means controlled by said dial actuating means for placing a different one of said signal devices under the influence of said level detecting means during the wind-up and release movements of said dial whereby a separate indication for the dial wind-up and release movements is obtained when the level of the sound emitted by the dial contacts during these movements exceeds the predetermined level.

6. In combination, a sound level indicator, a telephone dial, a continuously rotating shaft in axial alignment with said dial, a friction disc mounted on one end of said shaft, means for moving said rotating shaft towards said dial to cause said friction disc to engage the face of said dial whereby the rotational movement of said shaft is imparted to said dial and said dial is wound up, means for disengaging said disc from said dial after said dial is wound up whereby said dial is released, a signal device, a second signal device and means controlled by said shaft for effectively associating said first signal device with said sound level indicator during the wind-up of said dial and the second signal device with said sound level indicator during the release movement of said dial.

7. In a system for testing the level of sound emitted by the operating contacts of a telephone dial, the combination of a dial, mechanical means for alternately winding up and releasing said dial, signaling devices corresponding to the wind-up and release movements respectively, of said dial, means controlled by said mechanical means for preparing an operating circuit for one of said signaling devices during the wind-up of said dial and for preparing an operating circuit for the other of said signaling devices during the release of said dial, means for developing voltages commensurate with the level of the sounds emitted by the contacts of said dial, means for amplifying the developed voltages and means responsive to amplified voltages in excess of a predetermined voltage level corresponding to a predetermined sound level for completing the circuits prepared for said signaling devices.

NORMAN R. STRYKER.